US006981564B2

(12) United States Patent
Bédard et al.

(10) Patent No.: US 6,981,564 B2
(45) Date of Patent: Jan. 3, 2006

(54) SIDE PANEL FOR A RECREATIONAL VEHICLE

(75) Inventors: Yvon Bédard, Orford (CA); André Fournier, Sherbrooke (CA); Jean-François Desmarais, Racine (CA); Michel Lefebvre, Valcourt (CA)

(73) Assignee: Bombardier Recreational Products Inc., Valcourt (CA)

( * ) Notice: Subject to any disclaimer, the term of this patent is extended or adjusted under 35 U.S.C. 154(b) by 229 days.

(21) Appl. No.: 09/877,190

(22) Filed: Jun. 11, 2001

(65) Prior Publication Data

US 2002/0011364 A1 Jan. 31, 2002

Related U.S. Application Data

(60) Provisional application No. 60/282,187, filed on Apr. 9, 2001.

(51) Int. Cl.
*B62D 25/12* (2006.01)

(52) U.S. Cl. .................................................. 180/69.24

(58) Field of Classification Search ................. 180/182, 180/184, 186, 190, 68.1, 68.3, 69.2, 69.24; 296/180.1, 196, 146.11; 16/224, 225

See application file for complete search history.

(56) References Cited

U.S. PATENT DOCUMENTS

| 1,963,273 A | * | 6/1934 | Kellogg | 180/69.2 |
|---|---|---|---|---|
| 2,656,904 A | * | 10/1953 | Grenier | 180/190 |
| 2,732,581 A | * | 1/1956 | Heck | 16/224 |
| 2,746,081 A | * | 5/1956 | Gershen | 16/225 |
| 3,583,506 A | | 6/1971 | Preble | |
| 3,583,507 A | | 6/1971 | Trautwein | |
| 3,622,196 A | | 11/1971 | Sarra | |

(Continued)

FOREIGN PATENT DOCUMENTS

CA 225769 8/1995

OTHER PUBLICATIONS

Brochure of Yamaha Snow Scout: Motoneige Quebec, 1987, vol. 13, No. 1 (CA).
Brochure of Yamaha Snow Scout: Snowmobile Brochure Business, $3_{rd}$ Annual.
Snow tech, Spring 1999, Article "Special Report" Redline Snowmobiles, pp. 28–31.
Montoneige Quebec, vol. 25–No. 3, Nov. 1999, pp. 1 (front cover), 6, 31 and 58.
Creations J.P.L. Inc. Advertisement (advertising seat designs).
Magazine Article: Dirt Wheels/Jan. 1991.
Magazine Supertrax/Jan. 1999. (cover page only).

*Primary Examiner*—Frank Vanaman
(74) *Attorney, Agent, or Firm*—BRP Legal Services

(57) ABSTRACT

A side panel for a recreational vehicle, such as a snowmobile is disclosed. The side panel extends from the windshield portion of the snowmobile to the pan portion. The side panel is hingedly attached at a front edge to the snowmobile so that the side panel opens outwardly along vertically oriented hinges. The side panel includes a windshield to protect the operator's legs. The side panel also includes an airbox which provides an air charge to the engine for combustion. In addition, an airbox, divisible into two parts is also disclosed. The airbox includes a portion adapted to be attached to the interior of the side panel or to a belt guard. A second portion of the air box can be disposed within the engine compartment.

15 Claims, 18 Drawing Sheets

U.S. PATENT DOCUMENTS

| | | | |
|---|---|---|---|
| 3,627,073 A | 12/1971 | Grimm | |
| 3,981,373 A | 9/1976 | Irvine | |
| 4,204,581 A | 5/1980 | Husted | |
| 4,204,582 A | 5/1980 | Van Soest | |
| 4,322,107 A * | 3/1982 | Ishizuka et al. | 296/146.11 |
| 4,437,529 A * | 3/1984 | Fralish | 180/69.2 |
| 4,502,560 A | 3/1985 | Hisatomi | |
| 4,613,006 A | 9/1986 | Moss et al. | |
| 4,633,964 A | 1/1987 | Boyer et al. | |
| 4,699,229 A | 10/1987 | Hirose et al. | |
| 4,848,498 A * | 7/1989 | Hart et al. | 180/69.2 |
| 4,848,503 A | 7/1989 | Yasui et al. | |
| 5,036,931 A * | 8/1991 | Iritani | 180/68.1 |
| 5,370,198 A | 12/1994 | Karpik | |
| 5,474,146 A | 12/1995 | Yoshioka et al. | |
| 5,495,910 A * | 3/1996 | Stauffer et al. | 180/69.2 |
| 5,564,517 A | 10/1996 | Levasseur | |
| 5,660,245 A | 8/1997 | Marier et al. | |
| 5,685,387 A * | 11/1997 | Rioux et al. | 180/190 |
| 5,782,312 A * | 7/1998 | Murakawa | 180/69.2 |
| 5,944,133 A | 8/1999 | Eto | |
| 6,099,097 A * | 8/2000 | Hocker et al. | 16/225 |
| 6,234,263 B1 | 5/2001 | Boivin et al. | |
| 6,276,482 B1 * | 8/2001 | Moriya et al. | 180/68.1 |

* cited by examiner

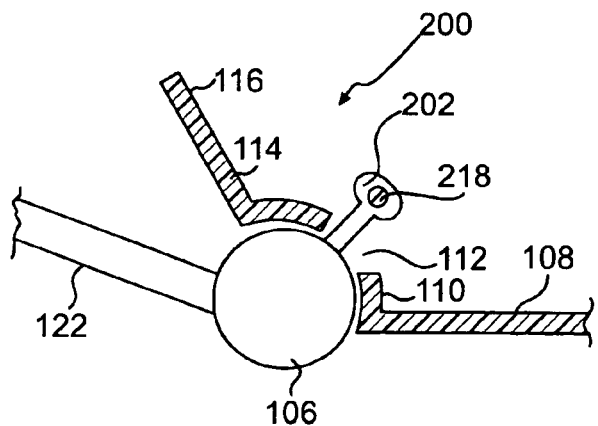
FIG. 12
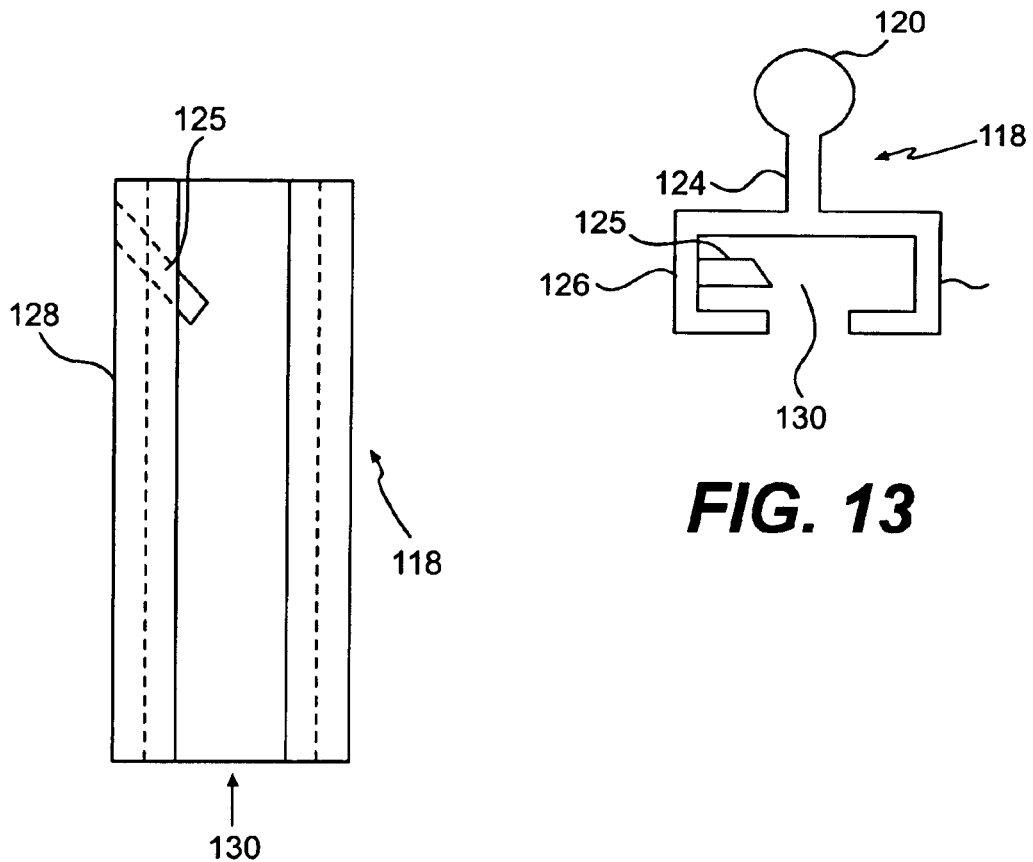
FIG. 13
FIG. 14

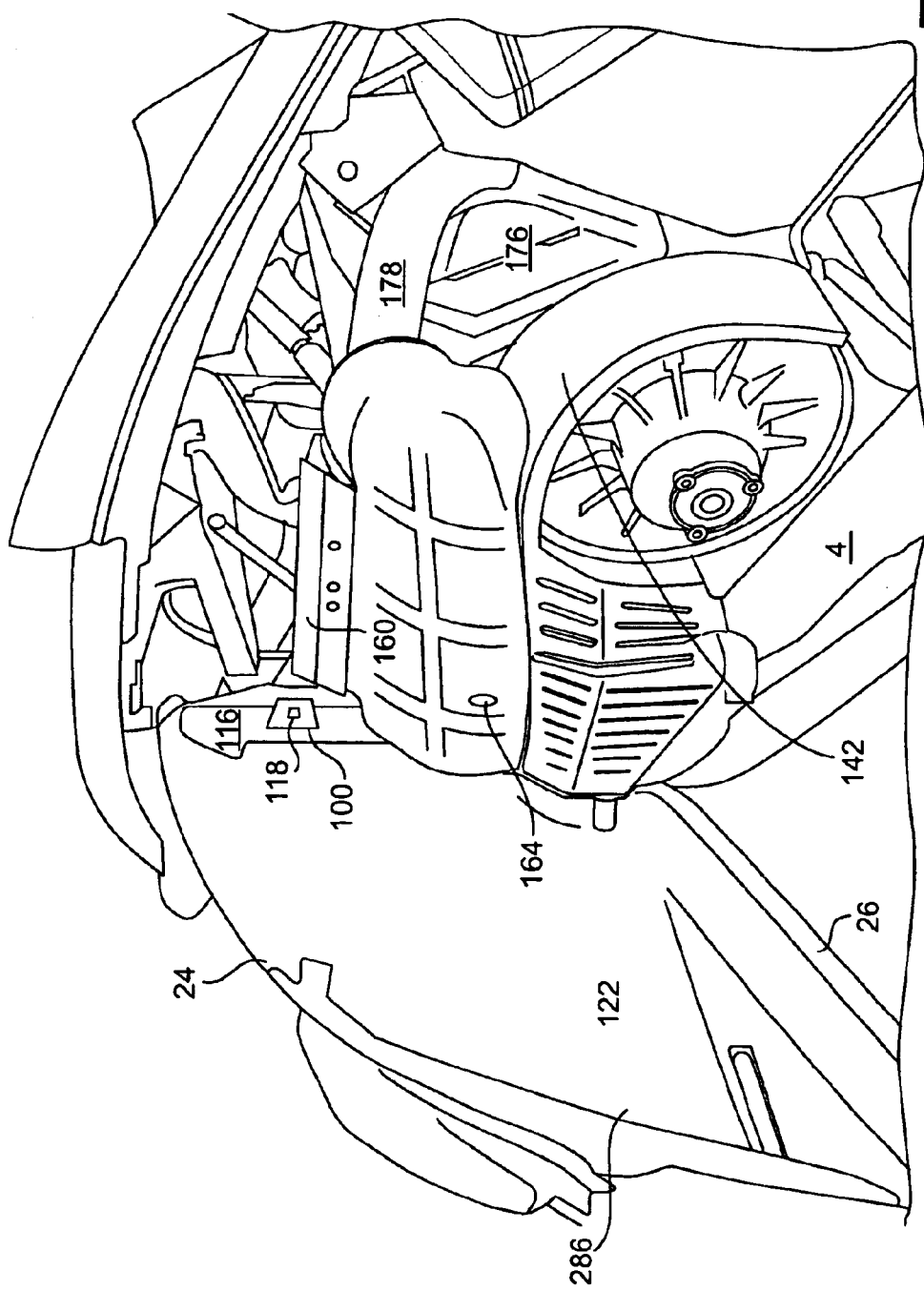

SIDE PANEL FOR A RECREATIONAL VEHICLE

This application claims the benefit of U.S. Provisional Patent Application 60/282,187, titled "SIDE PANEL FOR A RECREATIONAL VEHICLE" filed on Apr. 9, 2001, which is incorporated herein by reference. This application also or orates by reference U.S. patent application Ser. No. 09/472,134, filed on Dec. 23, 1999. This application also incorporates by reference U.S. Provisional Patent Application No. 60/167,614, filed on Nov. 26, 1999. In addition, this application also incorporates by reference Canadian Patent Application No. 2,256,954, filed on Dec. 23, 1998.

FIELD OF THE INVENTION

The present invention concerns the overall design and applicability of a side-enclosing panel, or fairing, for a recreational vehicle. More particularly, the present invention relates to a side panel for vehicles such as snowmobiles where, among other features, the panel is outwardly movable along a substantially vertical hinge (or pivot) due to its mounting characteristics and positioning. Furthermore, the design of the side panel is enhanced through multi-dimensional planes that increase the aerodynamic utility of the side structures while at the same time providing an airbox support as well as a leg support wall to accommodate and protect the operator's legs, both from wind and obstacles such as branches.

BACKGROUND OF THE INVENTION

Conventionally, vehicles such as snowmobiles 700 (illustrated in FIG. 7) are constructed with a tunnel 702 supported by a suspension system 704. An endless track 706, which is operatively connected to an engine 708, slides around a suspension system 704 to propel the snowmobile 700. The snowmobile 700 has a front end 710 and a rear end 712. Handlebars 714 extend above a seat 716 behind the engine 708. The handlebars 714 are operatively connected to the skis 718 to steer the snowmobile 700 across the ground.

Fairings 720 are disposed around the engine 708 at the front end 710 of the snowmobile 700. The fairings 720 are provided to protect the engine 708 from the environment and to provide a platform onto which graphics may be applied so that the snowmobile 700 is aesthetically pleasing to an operator 722. Typically, in the conventional snowmobile 700, the fairings 720 have two parts, a hood section 724 and a pan section 726. The hood 724, which may or may not include a windshield 728, is usually connected pivotally to the snowmobile 700 at the front end 710. Accordingly, the hood 724 opens in the direction shown by the arrow 730.

One problem with the design of prior art snowmobiles is that access to the engine 708 is sometimes limited by the construction of the hood 724 and the pan 726, which may impede access to certain engine components. While not a significant problem for most prior art snowmobiles, modem snowmobiles have advanced in both size and complexity to require different approaches to the design of the panel(s) providing access to the engine and the engine components that such snowmobiles employ for propulsion.

One solution has been to provide side panels on snowmobiles that open by being rotated downwardly, providing operator access to the middle and lower portions of the engine. However, these side panels typically have been of a small size and, as a result, the regions of the engine capable of being accessed through these panels have been limited due to the small openings created when the side panels are opened.

The reasons behind maintaining relatively small side panels stem from design and practicability concerns. In the past, side panels have been constructed to be horizontally hinged to the base of the snowmobile so that they open in a direction downward and away from the snowmobile, toward the ground. Due to space restrictions, opening a side panel along a horizontal axis does not permit use of a larger side panel design. In particular, if large side panels are opened outwardly and downwardly along a horizontal axis, such panels create a barrier restricting the operator from examining a position in the middle of the opening, because the panel itself becomes an obstacle when it is rotated downwardly from the side of the snowmobile.

As stated previously, to the extent incorporated into prior art snowmobiles, side panels have been designed solely to provide access, although limited, to the engine of the snowmobile. Little if any thought was given to designing a side panel that could accomplish other functions, such as providing a windshield for the operator's legs or providing an attachment position for an airbox.

The traditional placement of knee rests has most often been in an area directly behind the side panel. The knee rest has never been incorporated into or attached to the side panel itself.

The traditional placement of the airbox on a conventional snowmobile has been between the engine and the gas tank. Primarily this was because the engine was situated toward the front of the vehicle. In a new design for a snowmobile, such as that shown in FIG. 1, however, the driver is positioned more forwardly. The engine of the vehicle shown in FIG. 1 is moved towards the rear of the vehicle. When compared to a conventional vehicle such as that shown in FIG. 7, the available space for an airbox between the engine and the fuel tank is reduced such that an airbox small enough to fit in such a space would not have a sufficient air volume for the engine to function properly.

Traditionally, the space between the belt guard and the hood was not used to hold an airbox. If used at all on conventional snowmobiles, some manufactures use the space between the belt guard and the hood as a place to attach a spare belt for the CVT.

The prior art is replete with examples of the use of the side panels on a snowmobile. None of the prior art designs, however, provide the advantages of the present invention.

One example of a prior art panel is incorporated in the Prowler snowmobile marketed by Artic Cat. The side panels on the Prowler are nothing more than rectangular access panels that extend between the upper windshield and the base of the snowmobile's frame. The rectangular side panel structures are horizontally hinged at the lower base and open downwardly, away from the snowmobile, toward the ground. The relatively small surface area of the side panels, by comparison to the relatively large size of the windshield, are obvious indicators of the limited access that the panel provides to the engine compartment of the snowmobile. In addition, the Prowler's side panels fail to provide any further significant advantage(s) outside that of covering an opening into the interior of the snowmobile. The leg support walls lie in a position separate from and inside of the side panels. The Prowler's side panels also lack any significant aerodynamic qualities or traits that deflect airflow (or wind) away from the legs of the operator. Moreover, the airbox on the Prowler is positioned conventionally.

Another prior art snowmobile, the Phazer marketed by Yamaha, employs side panels that are similar to the Prowler's side panels. The Phazer's side panels are hinged to the frame of the snowmobile at the base (or lower edge portion of the panel). The side panels open horizontally downward, toward the ground, away from the vehicle. Like Artic Cat's side panels, the Phazer's side panels lack any aerodynamic (or other) features that deflect air away from the legs of the operator. The semi-rectangular panels also fail to provide a structure suitable for supporting the legs of the driver. On this vehicle, leg support structures are attached behind the panel. Additionally, the side panels do not provide a position to which the airbox may be attached. The side panels of the Phazer, therefore, lack any role outside that of providing access to the interior of the vehicle.

Side panels that are currently available for snowmobile construction fall short of providing a suitably larger opening to permit easy access the engine.

Additionally, side panels that are currently available lack any structural function outside that of providing access to the snowmobile's engine.

Accordingly, a need has arisen for an improved side panel that provides greater access to the interior frame and engine related components.

In addition, a need has developed for a design that deflects air away from the operator while the snowmobile is moving.

Also, a need has developed for a design to which an airbox may be affixed.

A need has arisen also for a snowmobile design where the airbox is situated in the space provided above the belt guard.

SUMMARY OF THE INVENTION

The present invention improves upon conventional snowmobile side panel design by providing opening mechanisms that results in greater accessibility to the interior components of the snowmobile.

The present invention also improves upon conventional side panel designs by providing unique aerodynamic characteristics.

Furthermore, the present invention also permits an airbox (or at least a portion thereof) to be attached to the side panel.

The overall size of the side panel of the present invention is far greater than that of conventional panels. Therefore, when opened, the side panel provides significantly greater access to the snowmobile engine and interior components.

So that the side panels do not interfere with access to the interior, the panels are connected to the snowmobile so that they open outwardly along a substantially vertical axis.

In another aspect, the present invention provides a side panel that is capable of protecting the operator's legs.

Furthermore, the present invention further includes an air-deflecting shield attached on the upper portion of the side panel. The air deflector is mounted in a position on the upper portion of the main member to serve as a wind deflector by which the operator's lower extremities are protected against the wind.

Another unique aspect of the present invention involves the placement and utilization of elastic, resilient hinges along the exterior edges of the side panel main member and pan. Elastic, resilient hinges handle variable stresses better than certain inelastic hinges. Accordingly, elastic hinges are better able to cope with the variable, high stresses placed upon them when the side panels are opened.

In addition, the present invention provides for a unique hinge arrangement that facilitates attachment of the side panel to the snowmobile. According to this aspect of the invention, the hinge is molded as a part of the side panel and easily and quickly connects to the snowmobile through a single slide connector.

Additionally, air slits are provided along lower and upper portions of the side panel for directing airflow therethrough. The air slits ventilate air into and out of the engine compartment to regulate the temperature of the engine and interior pan.

The present invention also provides for a construction where at least part of the air box for the engine is attached to the interior surface of the side panel. As a result, when the side panel is opened, the primary portion of the air box is removed from the engine compartment, out of the way of the person seeking access to the engine compartment. With such a construction, maintenance and/or service of the engine is greatly facilitated. When the side panel is closed, the self-aligning primary portion of the airbox attached to the interior of the side panel self aligns itself with a secondary portion of the airbox situated near the engine. Accordingly, the primary portion of the airbox is situated above the belt guard once the side panel is closed.

The present invention also provides an airbox which is constructed of a primary portion and a secondary portion.

The present invention also provides an airbox which includes a self-aligning portion between the primary and secondary portions.

The present invention also provides for an airbox which is situated above the belt guard.

BRIEF DESCRIPTION OF THE DRAWINGS

For a better understanding of the present invention as well as other objects and further features thereof, reference is made to the following description which is to be used in conjunction with the accompanying drawings. Common reference numerals are used in the various figures to designate the same structure. In the figures:

FIG. 12 is a cross-sectional view of the hinge illustrated in FIG. 11, once assembled.

FIG. 13 is an end view of a locking bar member, which is an element of the hinge illustrated in FIG. 9;

FIG. 14 is a bottom view of the locking bar member, which is an element of the hinge illustrated in FIG. 9;

FIG. 18 is another embodiment of the present invention showing a perspective illustration of a portion of the left side of the snowmobile illustrated in FIG. 1, showing a portion of the air box affixed to the belt guard and also showing the remaining portion of the air box positioned within the engine compartment behind the transmission.

DETAILED DESCRIPTION OF THE PREFERRED EMBODIMENTS

Throughout the description of the several embodiments of the present invention, reference will be made to various elements, the construction of which is readily known to those skilled in the art. Accordingly, an exhaustive description of each and every component is not provided, only a description of those elements required for an understanding of the present invention.

Figure 1:
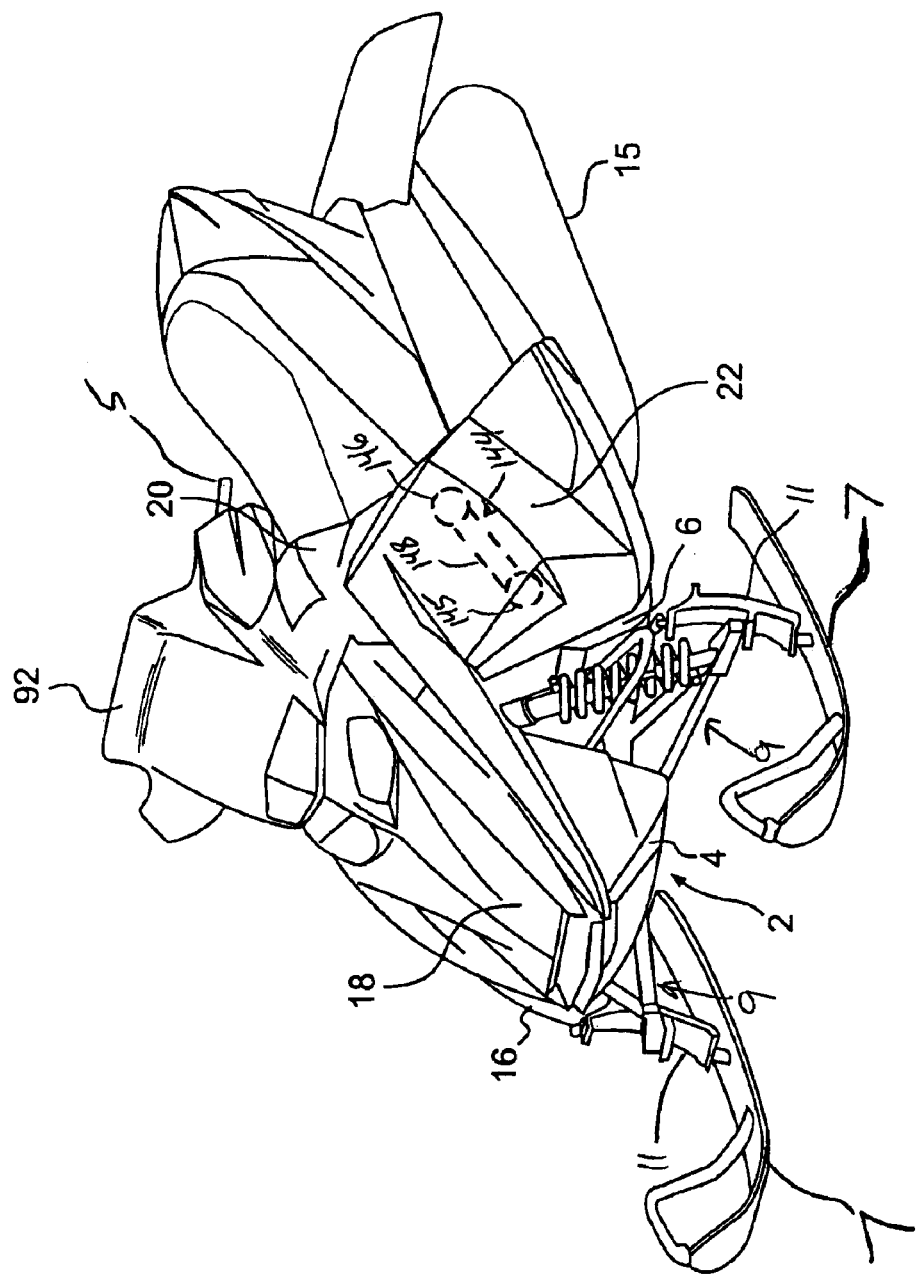
FIG. 1 is a perspective illustration of a snowmobile equipped with the side panels of the present invention (among other features)

FIG. 1 provides a perspective view of a snowmobile including several features of the present invention. The snowmobile includes a steering device 5 operatively connected to two skis 7. The oparative connection includes, but is not limited to, a suspension system 9 and support members 11. The complete operative connection is disclosed in Canadian Patent Application No. 2,256,944, incorporated herein by reference. The snowmobile also includes a main exterior frame 2, which includes a hood 16, a pan 4, and two side panels, or fairing main members 22.

In the preferred embodiment, the hood 16 is further sectioned into a front portion 18 and a rear portion 20. The front portion 18 is the outermost area that begins at the front tip of the snowmobile and extends rearwardly to a point directly ahead of the windshield 92. The front portion 18 is hinged at the front and opens upwardly and outwardly, away from the windshield 92. The rear portion 20 extends rearwardly, along and beneath the windshield 92. In the preferred embodiment, the rear portion 20 is fixed and immovable. However, in the alternative, the rear portion 20 could be designed so that it opens to provide access to portions of the engine compartment covered thereby.

The pan 4 extends under the hood 16 on the lower side of the snowmobile, as illustrated in FIG. 1. Preferably, the pan 4 extends beneath the engine of the snowmobile to the cavity under the seat in which the endless track 15 is positioned. The pan 4 may be further subdivided into a side pan 6, a front pan 8, and an upper pan 10.

Figure 2:
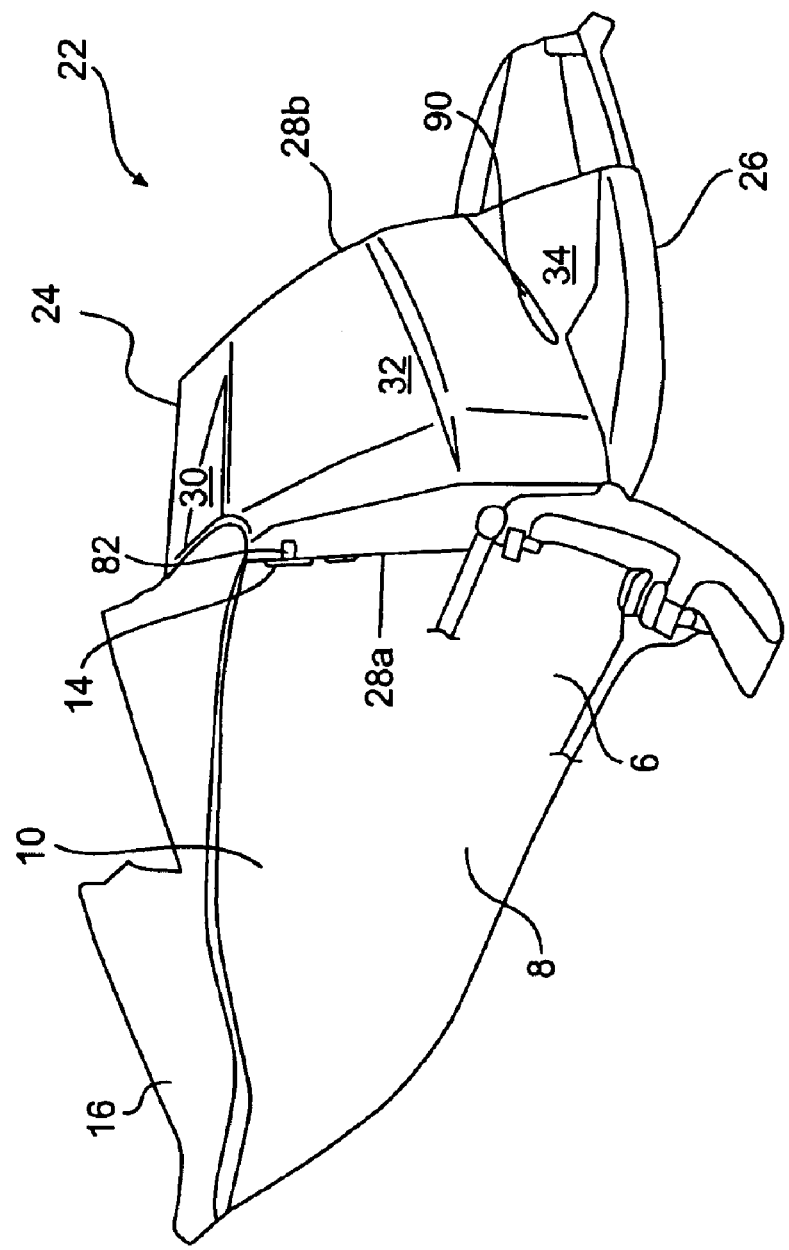
FIG. 2 is a perspective view of a portion of the snowmobile illustrated in FIG. 1 the view being taken from a frontal position illustrating an exterior surface of a side panel main member in a closed position, attached to a pan along the side of the snowmobile.

As illustrated in FIG. 2, at least one vertical wall 14 preferably is positioned forwardly of the side panel member 22. The hood 16, pan 4, and side panel 22 combine to form the exterior frame 2 of the snowmobile. As shown in FIG. 2, the side panel main member 22 comprises an upper edge 24, lower edge 26, and opposing side edges 28a, 28b (see FIG. 3 for a clearer illustration of the opposing side edge 28b). These edges collectively define the shape of each side panel main member 22.

The upper edge 24 defines the outermost boundary of the upper portion 30. In the preferred embodiment, this boundary sits adjacent to the hood 16. This means that the upper edge 24 is adjacent the front portion 18, the rear portion 20, or both. Lower edge 26 defines the outermost boundary of the lower portion 34 of side panel member 22. This boundary is positioned adjacent to the side pan 6. The two opposing side edges 28a, 28b complete the boundaries of the side panel member 22. As illustrated, the side edge 28a is positioned adjacent to the vertical wall 14.

Figure 3:
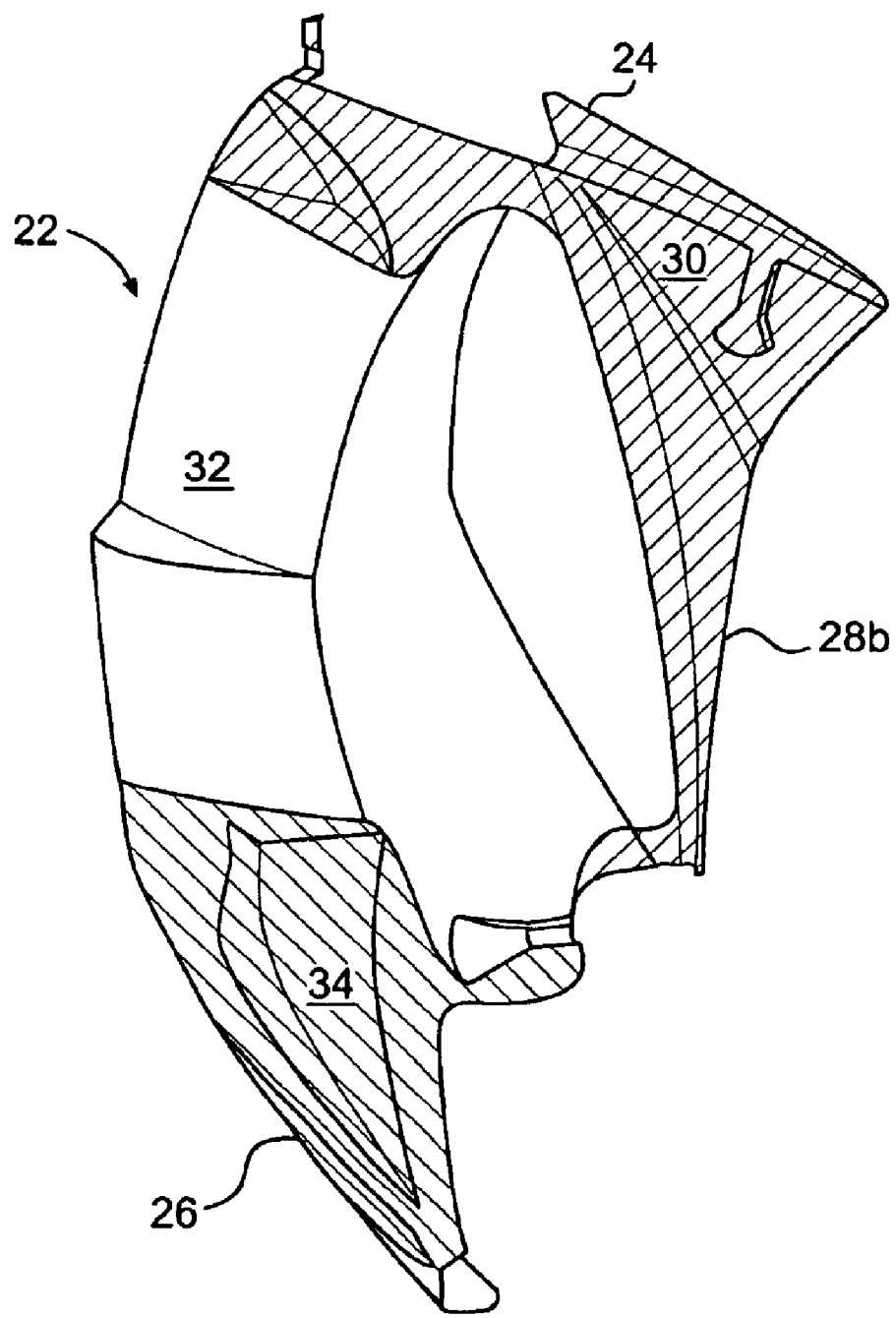
FIG. 3 is a partial cross-sectional view of the side panel of the present invention as shown in FIG. 1, the perspective being taken from a rearward position and illustrating a portion of the exterior surface of the side panel main member in a closed position.

FIG. 3 provides further details concerning the construction of the side panel main member 22. The side panel main member 22 has an upper portion 30, which is located along the middle and upper half thereof. Directly adjacent to the upper portion 30, is a middle portion 32, which is the central most region of the side panel main member 22. Located further below and adjacent to the middle portion 32, is a lower portion 34. The lower portion 34 defines the lowest most portion of the side panel main member 22.

Figure 4:
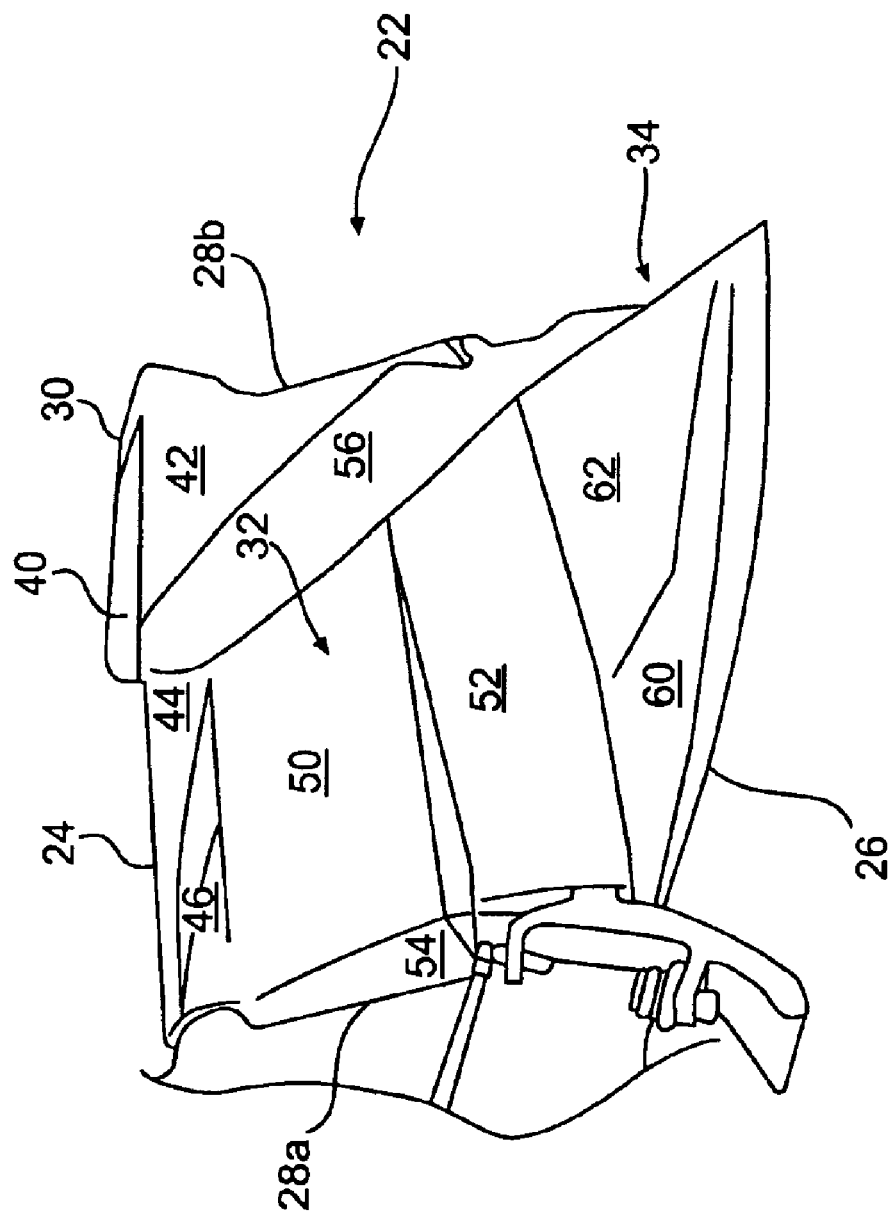
FIG. 4 is a perspective view of a portion of the snowmobile illustrated in FIG. 1, the perspective being taken from a frontal position and illustrating an exterior surface of a side panel main member in an open position, attached in a vertical-opening orientation to the side of the snowmobile.

As FIG. 4 illustrates, the upper portion 30 of the side panel 22 includes an outwardly directed upper fin member 40, a lower fin member 42, an upper elongated section 44, and a lower elongated section 46. The upper fin member 40 and the upper elongated section 44 are at least adjacent to the upper edge 24. The lower fin member 42 and the lower elongated section 46 at least are adjacent to the opposing side edges 28b, 28a, respectively. These various components collectively define the shape and positioning of the upper portion 30 of the side panel main member 22.

As illustrated in FIGS. 3 and 4, the middle portion 32 of the side panel 22 includes an upper horizontally planar member 50, a lower horizontally planar member 52, a frontwardly facing vertical wall 54, and a rearwardly positioned inclined leg support wall 56. The upper horizontally planar member 50 is positioned at least adjacent to the upper portion 30. More specifically, upper horizontally planar member 50 lies adjacent to at least the lower elongated section 46. The lower horizontally planar member 52 lies adjacent to at least the lower portion 34. The lower horizontally planar member 52 is located adjacent to the curved outer member 60 and a defined triangular member 62. Vertical wall 54 includes the side edge 28a. The rearwardly-positioned, inclined leg support wall 56 lies adjacent to the side edge 28b.

The curved outer member 60 and defined triangular member 62 are included within the lower portion 34. The curved outer member 60 is positioned adjacent to the lower edge 26. The defined triangular member 62 lies adjacent the middle portion 32 and, more specifically, the lower horizontally planar member 52.

Figure 5A:
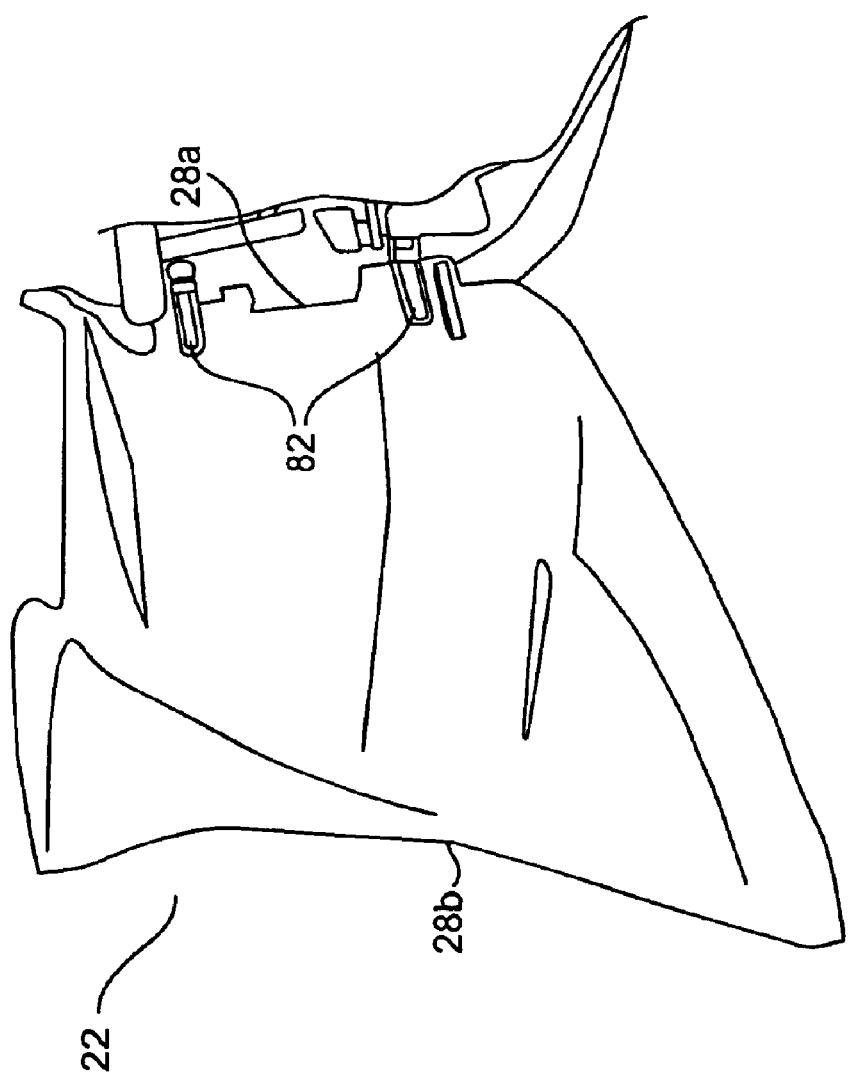
FIG. 5A is a perspective view of the interior surface of an open side panel main member, the perspective view being taken from the rear of the snowmobile and revealing the hinges connecting the side panel main member to a vertical wall of the snowmobile.

In FIG. 5A, the side panel main member 22 is shown in an open position. The view illustrated in FIG. 5A is taken from the rear, left side of the snowmobile (illustrated in FIG. 1), looking forward to the front of the snowmobile. (The front of the snowmobile is defined in relation to the travel direction of the vehicle.) The side panel 22 extends outwardly away from the engine compartment in the view shown. In one embodiment, the side panel 22 pivotally connects to the snowmobile through a plurality of elastic, resilient hinges 82. Those hinges are positioned along the forward edge 28a. As shown, two of the hinges 82 are preferred. However, as may be appreciated by those skilled in the art, a greater or fewer number may be employed to pivotally connect the side panel 22 to the frame of the vehicle.

Figure 5B:
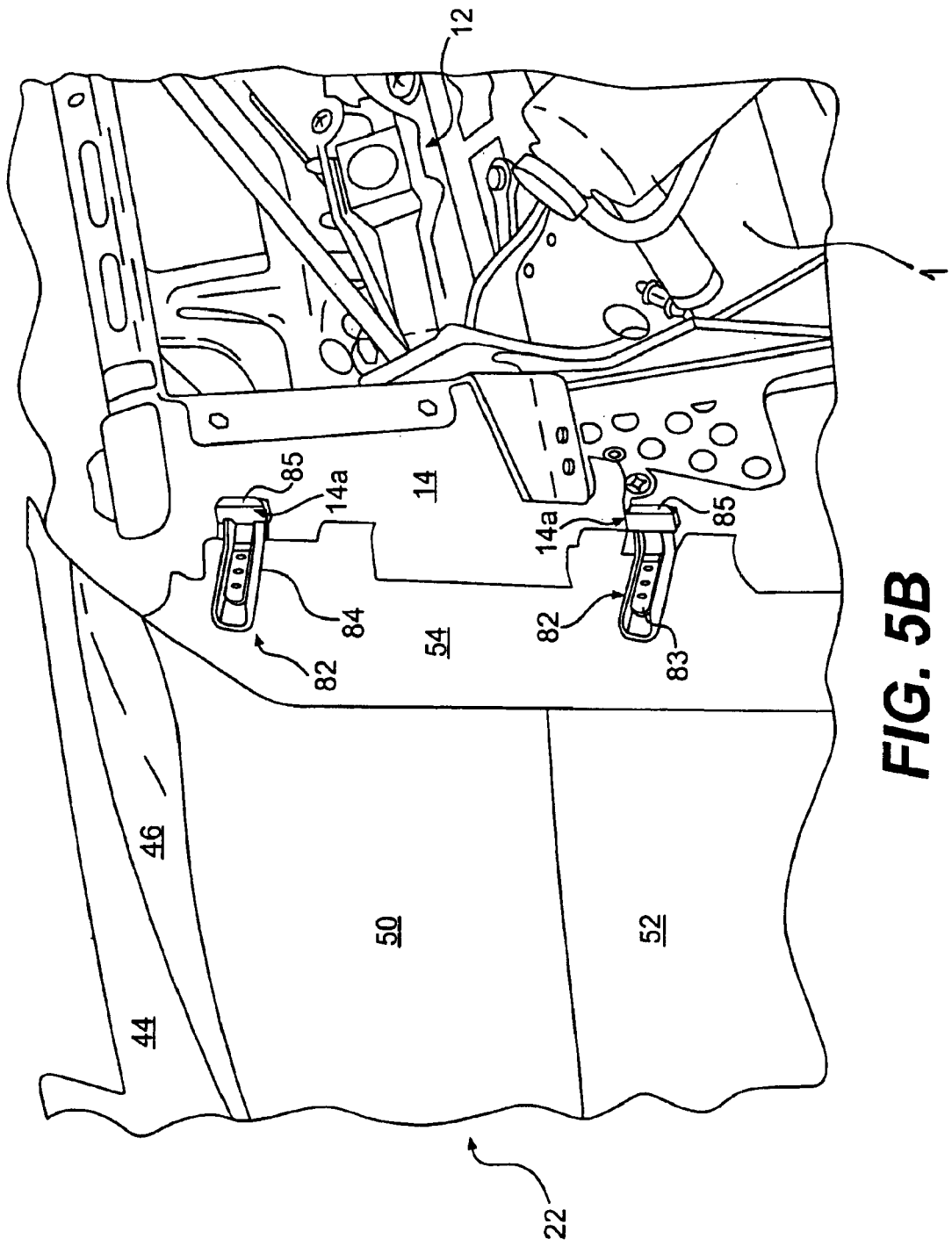
FIG. 5B is a close-up, perspective view of the hinge arrangement illustrated in FIG. 5A.

FIG. 5B provides further details of the hinge connections 82. In FIG. 5B, the side panel main member 22 is shown attached by two of the elastic, resilient hinges 82, which are spaced apart vertically along the vertical wall 14. The hinges 82 are attached to the vertical wall 14 to support the side panel 22 via the vertical wall 54.

Along the vertical wall 14 is a hinge clasp 14a. This is illustrated in detail in FIG. 5C. The hinge clasp 14a is comprised of raised wall 14b, and two dependent (or associated) walls 14c and 14d. The hinges 82 are attached to the vertical wall 14 by being drawn through the hinge clasp 14a. The hinges 82 are secured along a rearwardly-positioned base member 85. The base member 85 has suitably larger dimensions than will pass through the opening created within the hinge clasp 14a, thereby providing an effecting stopper against further inward movement of the hinge 82 relative to the hinge clasp 14a. It is preferred to have the hinges 82 attached to vertical wall 14 by being molded directly to hinge the clasp 14a. The hinge clasp 14a is itself preferably integrally molded to the vertical wall 14. The elastic, resilient hinges 82 are attached to vertical wall 54, by stretching the elastic, resilient portion into a position over a catch strip 83 along vertical wall 54. FIG. 5D illustrates this relationship.

Figure 5C:
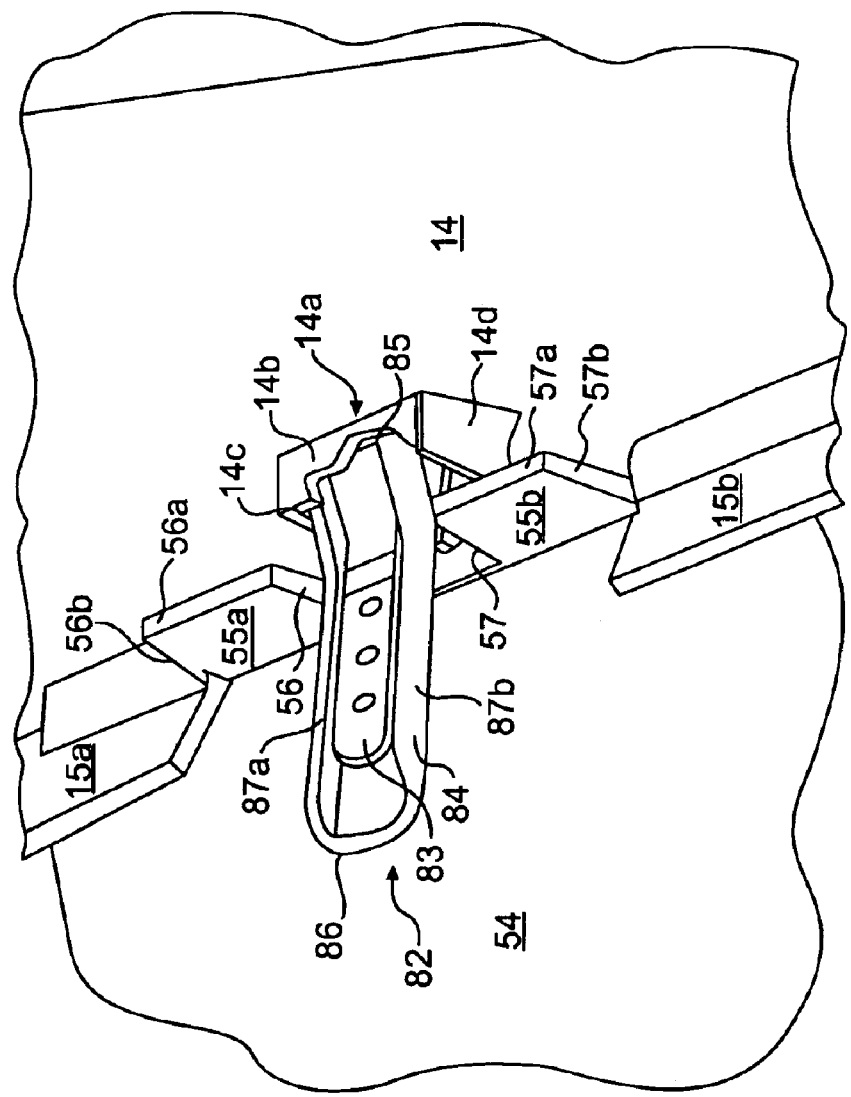
FIG. 5C is a close-up, perspective view of one of the hinges illustrated in FIG. 5B.
Figure 5D:
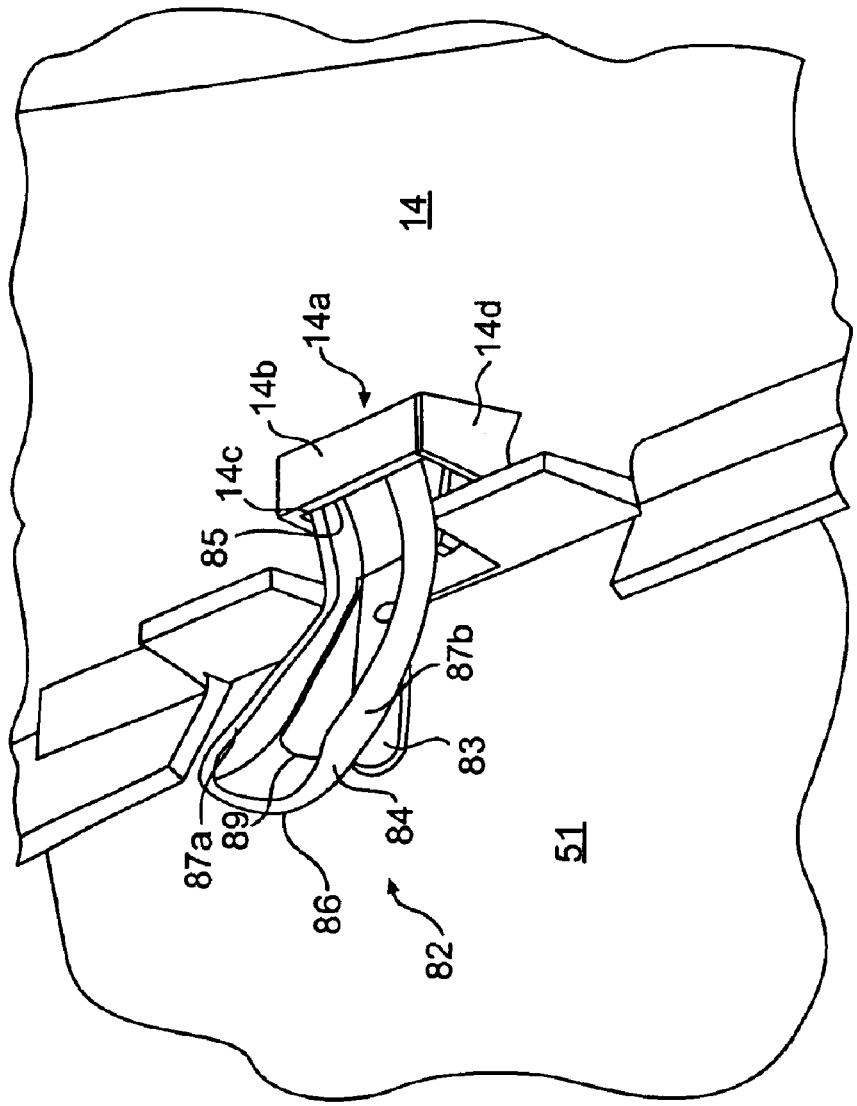
FIG. 5D is a perspective view of the hinge shown in FIG. 5D, showing an elastic, resilient hinge in a free position, which means that the hinge is not attached to a catch strip that secures the hinge to the vertical wall of the side panel main member.

FIG. 5C provides further detail of one of the hinges 82 illustrated in the perspective of FIG. 5B. FIG. 5C focuses on the mating relationship between the mating edges of the vertical wall 54 and the vertical wall 14. Along vertical wall 54 are a series of inwardly projecting tabs 55a, 55b which point in an inward direction towards the hinge clasp 14a. The uppermost projected tab 55a comprises a top 56a, and two opposing sides 56, 56b. The lower most projected tab 55b comprises a top 57a, and two opposing sides 57, 57b. The vertical wall 14 itself includes a series of tabs 15a, 15b which point outwardly away from the hinge clasp 14a and are positioned to lie outward of the tabs 55a and 55b.

After attaching the side panel main member 22 through the vertical wall 54 to the vertical wall 14, the tabs 55a, 55b on the side panel 22 mate into position resting between tabs 15a, 15b on the vertical wall 14. More specifically, the tabs 15a, 15b provide a recess between them to accommodate the tabs 55a, 55b. The tabs 15a, 15b, while in the mating position, rest along sidewalls 56b, 57b of the tabs 55a, 55b. Opening and closing of the side panel main member 22 causes the tabs 55a, 55b to rotate outwardly along the side walls 56b, 57b. Movement of the tabs 15a, 15b varies the degree of contact based upon the relative position of the side panel main member 22 to the vertical wall 14. More preferably, the degree of contact between the tabs 15a, 15b and the sidewalls 56b, 57b increases as the side panel main member 22 is opened. This provides progressively greater support as the side panel 22 opens. Conversely, the degree of contact between the tabs 15a, 15b and the sidewalls 56b, 57b is minimal, as shown in FIG. 5C, when the side panel main member 22 is in its closed position. The tabs 55a, 55b further provide an inner recess to accommodate the hinge 82. The inner recess is defined between the sidewalls 56, 57.

Once in a mating position, side panel main member 22 and pan 4 are effectively joined when hinges 82 are connected into place, with mating contact between walls 14 and 54.

A plurality of elastic, resilient hinges 82 preferably are used to connect the side panel 22 to the snowmobile, FIG. 5C shows details of one of them. Each hinge 82 includes an elastic, resilient material 84, having a curved front hinge tip 86, a rearwardly positioned base member 85, and two spaced apart leg portions 87a, 87b defining an open center portion 89 therebetween (see FIG. 5D).

The elastic, resilient material 84 may comprise, for example, any appropriate rubber, metal, plastic, or thermoplastic composite or any combination thereof. The elastic, resilient material 84, more preferably comprises a rubber-based material. The elastic, resilient material 84 need only be resilient enough to permit the leg portions 87a, 87b to stretch when the front tip 86 is grasped and pulled outward away from the hinge clasp 14a to connect the hinge 82 over the catch strip 83, mounted to the inside of the side panel 22. With this construction, the elastic, resilient material 84 will permit hinges 82 to provide flexibility and versatile extension qualities needed for hinges 82 to permit the efficient opening and closing of the side panel main member 22 and to hold the side panel 22 in place.

It would be appreciated by one skilled in the art that elastic material 84 may be also be used to hold side panel 22 in a fixed position. When side panel 22 is in a closed position, such as that shown in FIG. 1, elastic material 84 can be used to hold side panel in the closed position using the same arrangement illustrated in FIG. 5C. By placing the hinge clasp 14a on the rear portion of the hood 20 and the catch strip 83 along the upper edge 24 of the side panel 22, elastic material 83 will hold the side panel 22 in a closed position when fastened used as will be described below.

In fastening the hinge 82 to the catch strip 83 along the vertical wall 54, the hinge 82 first needs to be anchored into the hinge clasp 14a along the vertical wall 14 by any of the methods mentioned above. Then, the curved front hinge tip 86 is extended out and over catch strip 83, allowing the open center portion 89 (see FIG. 5D) of the hinge 82 to pass over the catch strip 83. Once the hinge 82 is over the catch strip 83 and pulled downward towards the surface of the vertical wall 54, the hinge 82 becomes securely fastened to catch strip 83 upon release. The elastic material 84 contracts upon release to grasp the catch strip 83. The hinge 82 retracts and the curved front hinge tip 86 becomes firmly pressed against the catch strip 83, providing a secure attachment.

With the elastic, resilient hinge 82, the side panel main member 22 can move outwardly, away from the interior portion, or chassis 1 (FIG. 5B), of the snowmobile 12 between an open position, as seen in FIG. 4, and a closed position as seen in FIG. 2. Thus, the side panel main member 22 can be opened outwardly along a substantially vertical axis, away from the snowmobile into an open position to provide access to the interior of the snowmobile. The side panel 22 also may be closed inwardly back towards the snowmobile along that same vertical axis.

Figure 6:
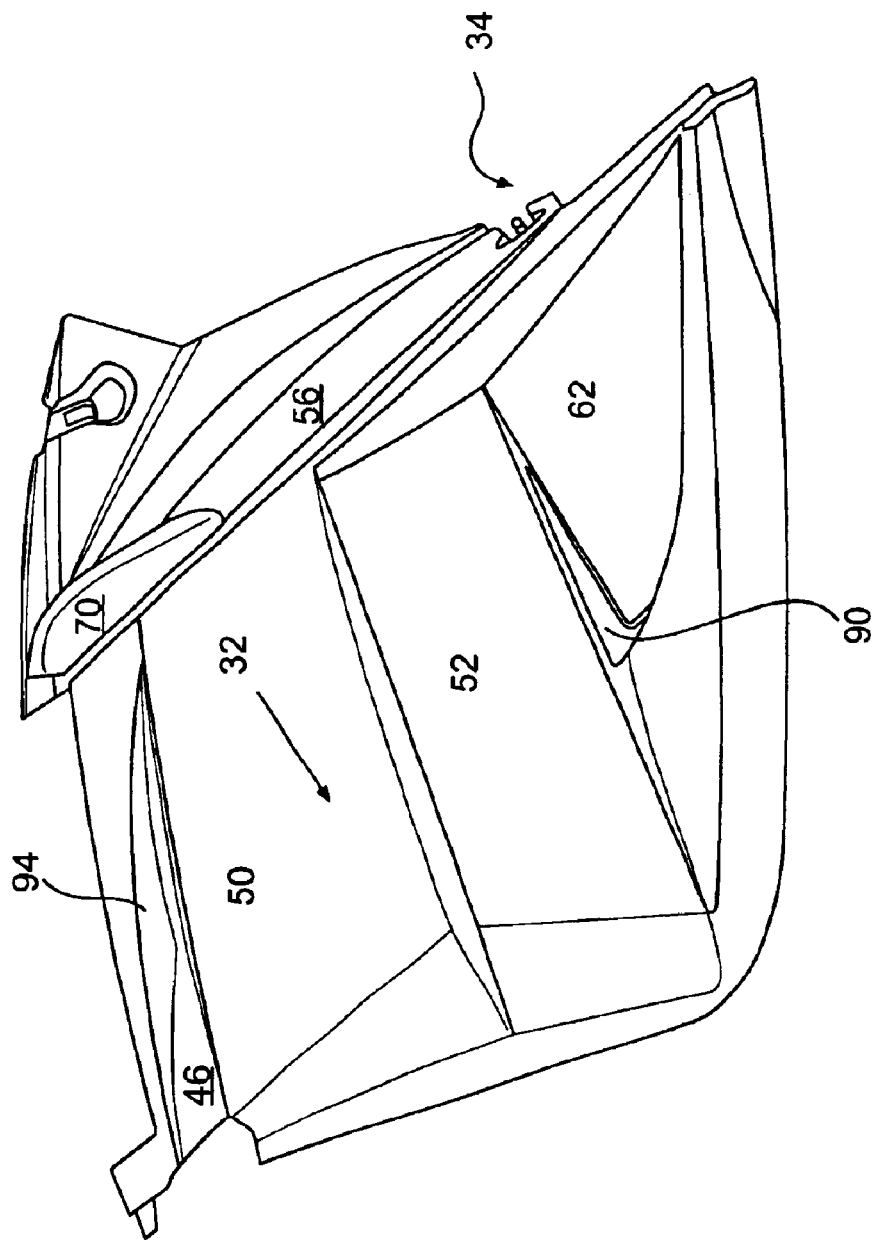
FIG. 6 is a side view of the exterior of one of the side panels illustrated in FIG. 1.
Figure 7:
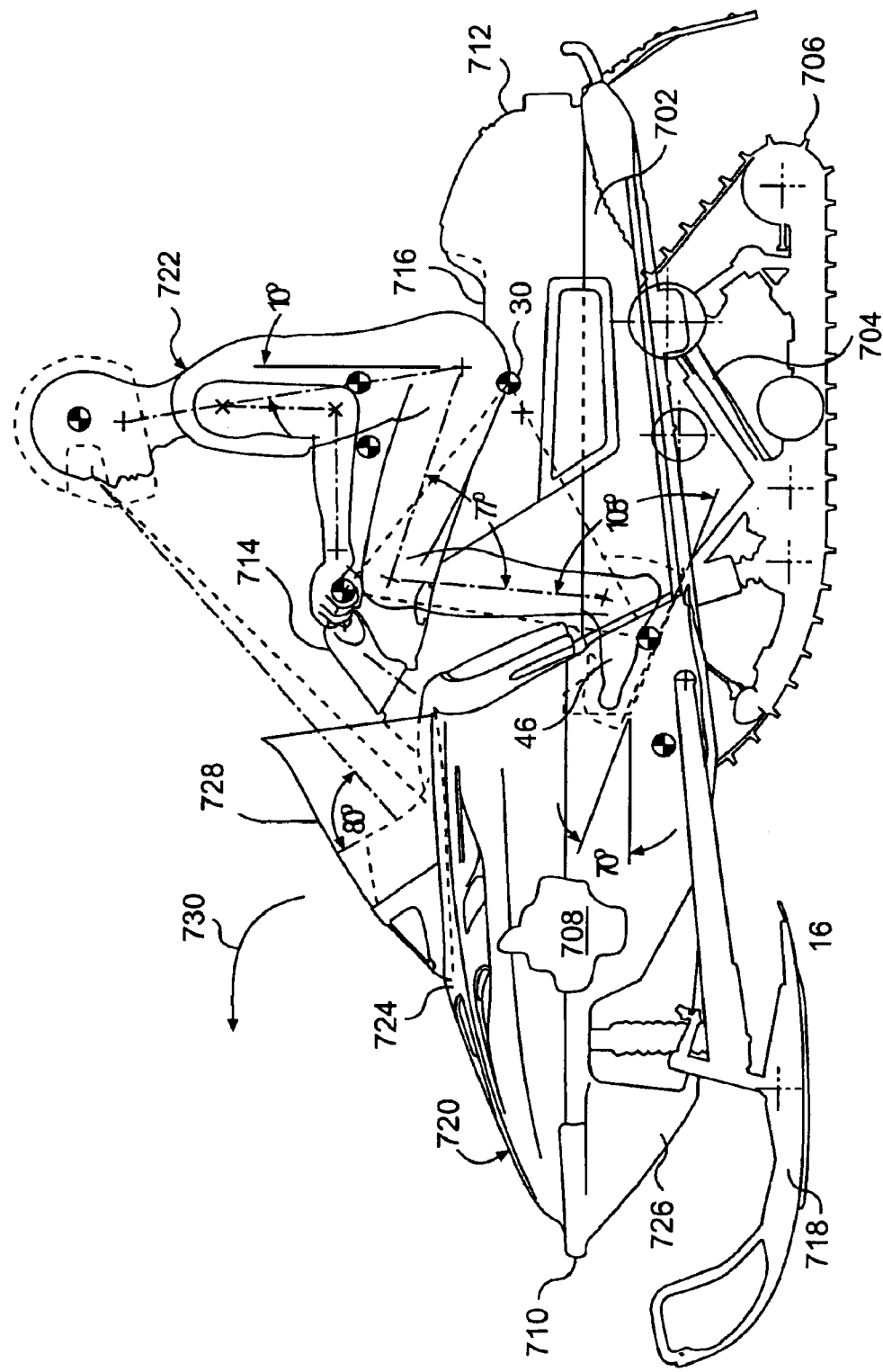
FIG. 7 is an exterior side view illustration of a prior art snowmobile.

FIG. 6 illustrates the position of an air slit 90 between lower horizontally planar member 52 of middle portion 32 and defined triangular member 62 of lower portion 34. The air slit 90 provides ventilation to the interior of the snowmobile so that warmer air generated by engine operation may be diffused with the cooler, outside air.

FIG. 6 also illustrates a carved out opening 94, which is provided along the lower elongated section 46 of the side panel 22, and serves as a pathway to allow air to travel from the interior region of the snowmobile to the outside, and vice-versa. This opening provides a ventilation path by which the higher temperatures within the interior of the snowmobile, usually resulting from the operation of the engine, will be controlled by the exchange of warmer air for the cooler air found outside the snowmobile.

The rearwardly positioned inclined leg support wall 56, shown in FIG. 6, is a design feature of the side panel 22 which affords the operator of the snowmobile a fixture that can accommodate and protect the knees of the operator. The rearwardly positioned inclined leg support wall 56 includes a region in the upper half where a deflector shield 70 is attached. It is the purpose of the deflector shield 70 to re-channel airflow over the snowmobile away from the operator's legs, allowing a more comfortable and enjoyable ride.

Figure 8:
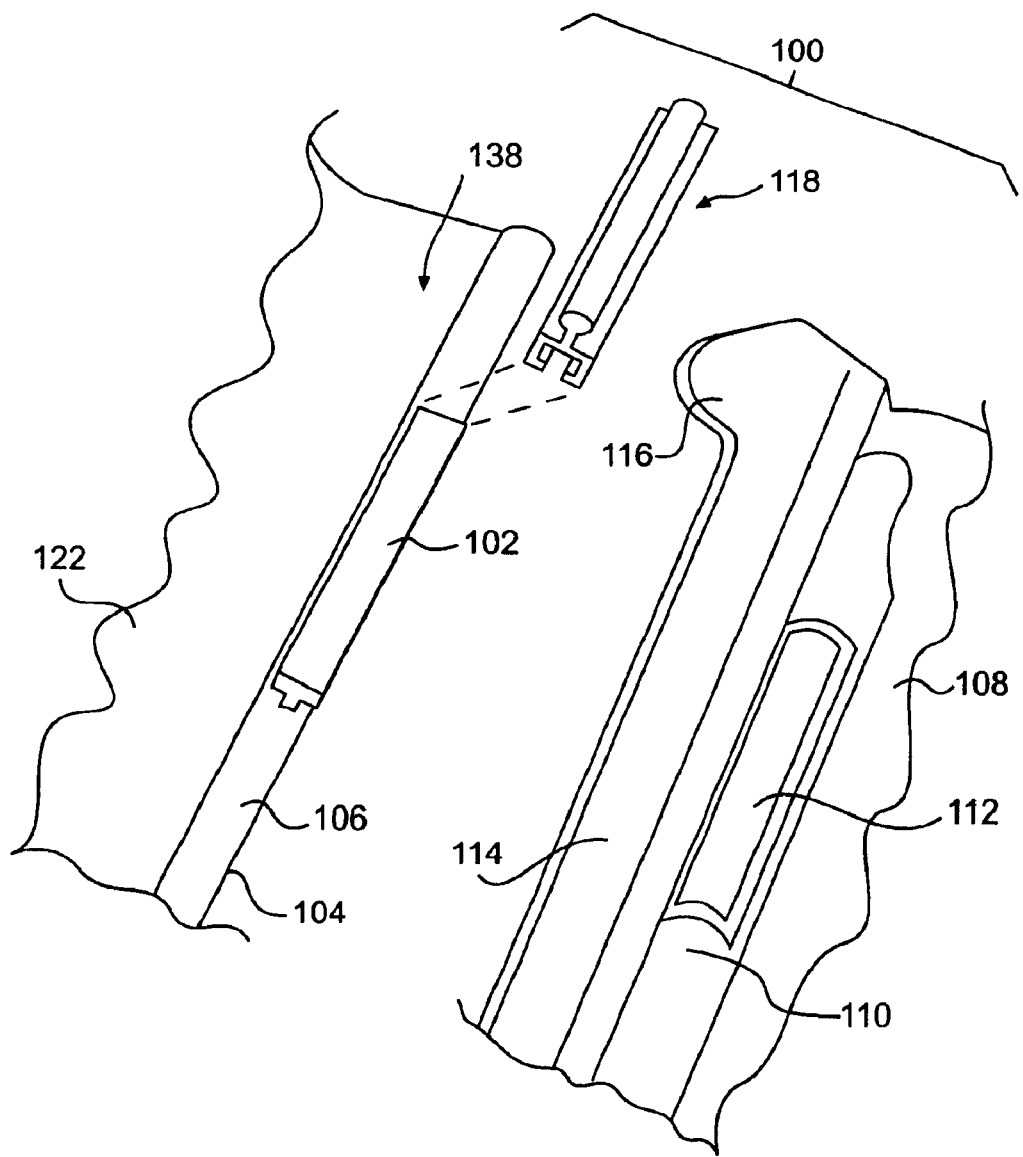
FIG. 8 is an enlarged, perspective, exploded view of another hinge assembly for connecting the side panel to the snowmobile shown in FIG. 1.

The present invention also contemplates the use of a second embodiment of the hinges 82, described above. In this second embodiment, a hinge 100 (illustrated in exploded detail in FIG. 8) incorporates fewer components than the hinge 82.

The hinge 100 includes a T-shaped protrusion 102 that is preferably, integrally molded to a forward edge 104 of the side panel 122. Preferably, the forward edge 104 of the side panel is provided with a rounded, thickened portion 106. The rounded, thickened portion 106 provides vertical strength and rigidity to the forward edge 104 of the side panel 122. It also provides a rigid structural support to which the T-shaped protrusion 102 may be attached. The rounded, thickened portion 106 and the channel 110 mate with each other to provide a ball-joint like structure in order to achieve smooth opening and closing of the side panel 122.

Figure 10:
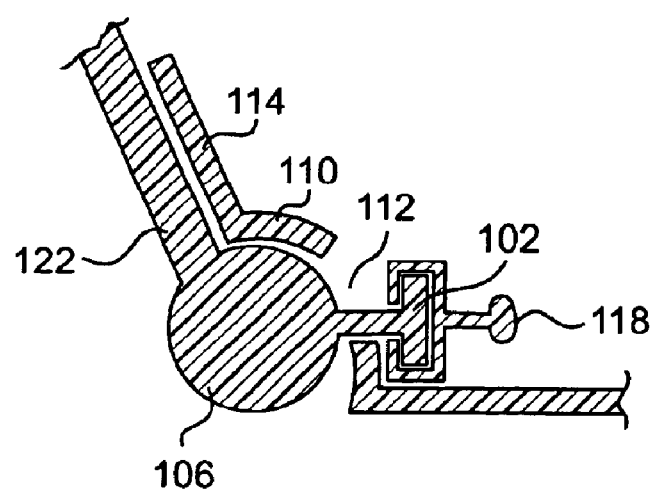
FIG. 10 is a cross-sectional view of the hinge illustrated in FIG. 8, once assembled and in a closed position.

When hinge 100 is in its closed configuration as shown in FIG. 10, the locking bar 118 is positioned adjacent the channel 110 such that any empty space between the locking bar 118 and the thickened portion 106 is filled by the channel 110. Side panel 122 will also be in contact with the front wall portion 114, thus creating a position in which the side panel 122 is tightly attached to the front vertical wall 108 preventing the side panel 122 from moving in any direction.

In the preferred embodiment, the side panel 122, the T-shaped protrusion 102, the forward edge 104, and the thickened portion 106 are all molded from a single material. Preferably, the material is plastic or thermoplastic. However, as would be recognized by those skilled in the art, the material could be any other material suitable for the exterior of the snowmobile to which the side panel 122 is attached. For example, the side panel 122, the T-shaped protrusion 102, and the thickened portion may be constructed from aluminum or other suitable, lightweight metal. While a thermoplastic material is preferred for its lightweight and resilience when an impact force is applied thereto, any suitable plastic, rubber, or composite material may be substituted therefor.

In the preferred embodiment of the hinge 100, a vertical wall 108 is attached to the snowmobile. The vertical wall 108 includes a channel 110 with a hole 112 therethrough. The vertical wall 108 also includes a front wall portion 114 with a protrusion 116.

As with the construction of the side panel 122 and associated structures, the vertical wall is preferably constructed of a plastic or thermoplastic material because of its strength, low weight, and resilience. However, as would be recognized by those skilled in the art, the material could be any other material suitable for the exterior of the snowmobile to which the vertical wall 108 is attached. For example, the vertical wall 108, channel 110, and protrusion 116 may be constructed from aluminum or other suitable, lightweight metal. While a thermoplastic material is preferred for its lightweight and resilience when an impact force is applied thereto, any suitable plastic, rubber, or composite material may be substituted therefor.

Both the side panel 122 and the front wall 108 form (at least in part) the exterior fairings of the snowmobile. The side panel 122 and the front wall 108 preferably are made of a plastic or thermoplastic material because such materials are resistant to impacts that might detract from the exterior appearance of the snowmobile. In addition, these materials are sufficiently rigid and resilient so that they can support the weight placed on the hinge 100. Also, such materials are sufficiently lightweight to minimize strains placed on the hinge 100. They also reduce the overall weight of the snowmobile on which they are used. While plastic or thermoplastic materials are preferred, those skilled will readily recognize that any suitable material (including aluminum) may be substituted therefor.

Figure 9:
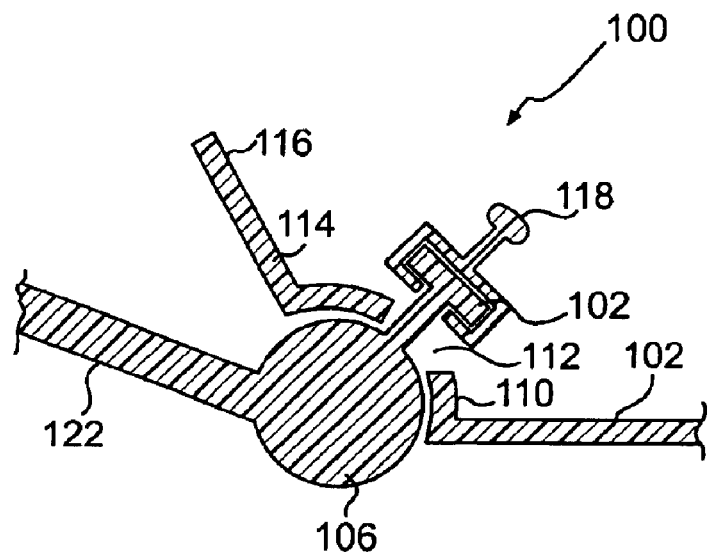
FIG. 9 is a cross-sectional view of the hinge illustrated in FIG. 8, once assembled.

To attach the side panel 122 to the front wall 108, the T-shaped protrusion 102 is first guided through the hole 112. Once inserted through the hole 112, the top of the T-shaped protrusion 102 extends outwardly of channel 110. A locking bar 118 is then removably attached to the T-shaped protrusion 102 by sliding the locking bar 118 onto the protrusion 102. A cross-sectional view of the hinge 100, once assembled, is shown in FIG. 9. Preferably, the locking bar 118 slides downwardly onto the T-shaped protrusion 102 in the direction indicated by the arrow 138.

Preferably, the locking bar 118 is made of a strong, lightweight material such as aluminum. Aluminum is preferred for the locking bar 118 due to its lightweight, strength, and resistance to corrosion. However, as will be appreciated by those skilled in the art, any suitable material (such as plastic) may be substituted therefor.

The locking bar 118 has a generally rounded top section 120, which is provided (among other reasons) to facilitate grasping by the snowmobile operator. A straight section 124 extends downwardly from the top section 120 and connects to two legs 126, 128. The legs 126, 128 extend outwardly and downwardly from the straight section 124 and curve inwardly to define a channel 130. The channel 130 is sized to accommodate the T-shaped protrusion 102. Preferably, as illustrated in FIGS. 13 and 14, channel 130 includes a pin 125 which inclines inwardly from the legs 126 or 128. Pin 125 prevents the locking bar 118 from sliding down and becoming inadvertently dislodged from the T-shaped protrusion 102.

The length of the locking bar 118 is greater than the length of the hole 112. Accordingly, when the locking bar 118 has been fitted over the T-shaped protrusion 102, the locking bar 118 prevents the T-shaped protrusion 102 from dislodging from within the hole 112. The locking bar 118, therefore, holds the T-shaped protrusion 102 in place so that the hinge 100 holds the side panel 122 to the vertical wall 108.

As can best be seen in FIG. 9, the thickened portion 106 fits readily into channel 110 on the vertical wall 108. The thickened portion 106 is preferably rounded so that the side panel 122 can rotate within the channel 110 so that the side panel 122 can open outwardly along the vertically-oriented hinge 100.

Figure 11:
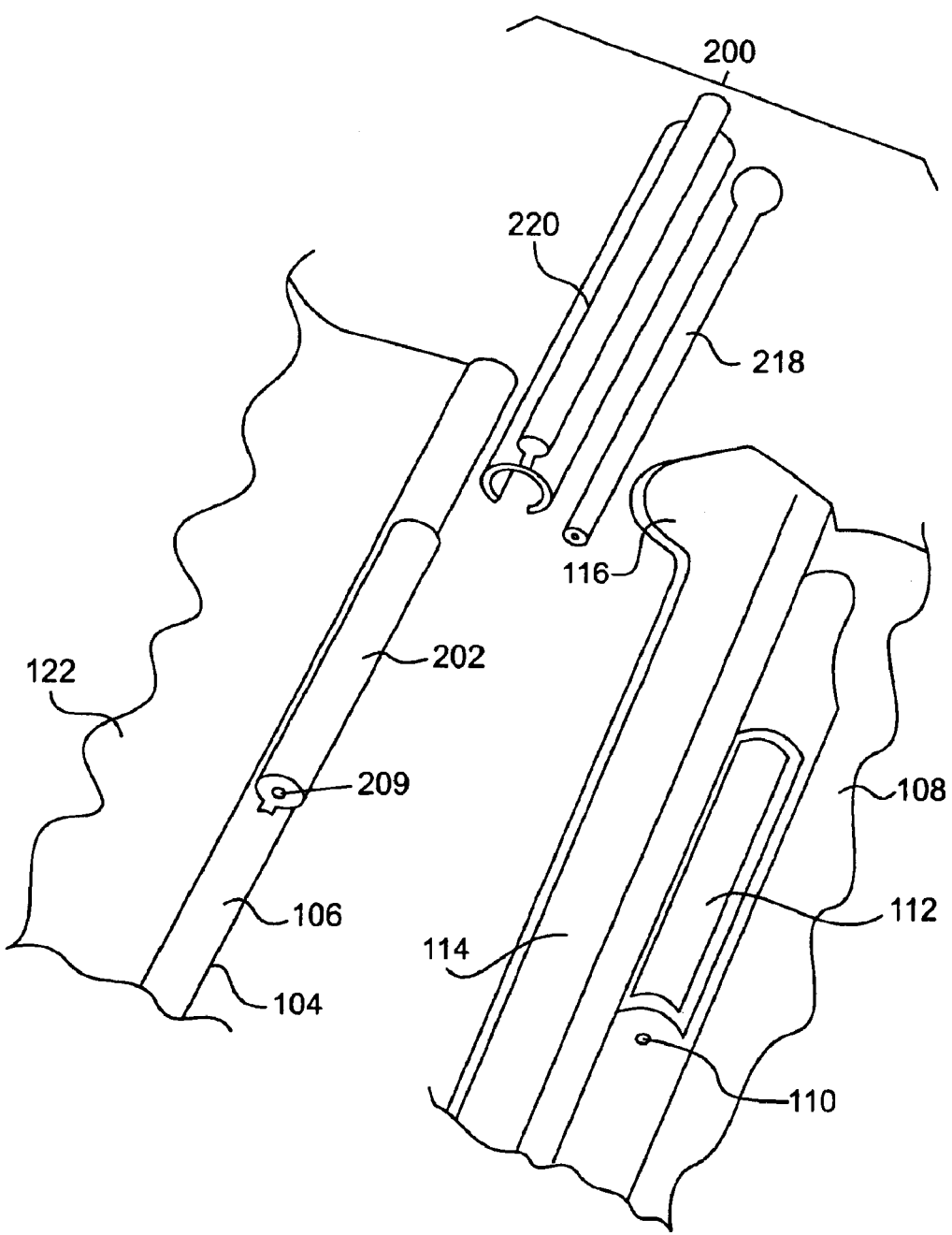
FIG. 11 is an enlarged, perspective, exploded of yet another hinge assembly for connecting the side panel to the snowmobile shown in FIG. 1

As would be known by one skilled in the art, the T-shaped protrusion 102 need not be T-shaped but, instead could be of any shape such as the one shown in FIG. 11. Hinge 200, shown in FIG. 11 includes a circular protrusion 202 which is integrally molded with the side panel 122. The circular protrusion 202 has a central bore 209 to accept the locking rod 218. The circular protrusion 202 could also be adapted to receive locking bar 220 which slides over the circular protrusion 202. The lengths of the locking rod 218 and locking bar 220 are sufficient to extend across the hole 112 and prevent side panel 122 from separating from the vertical wall 108. It is contemplated that either the locking rod 218 or the locking bar 230 will be used to connect the side panel 122 to the vertical wall 108, the two could be used together to provide a redundant connection between the wall 108 and the side panel 122.

Figure 15:
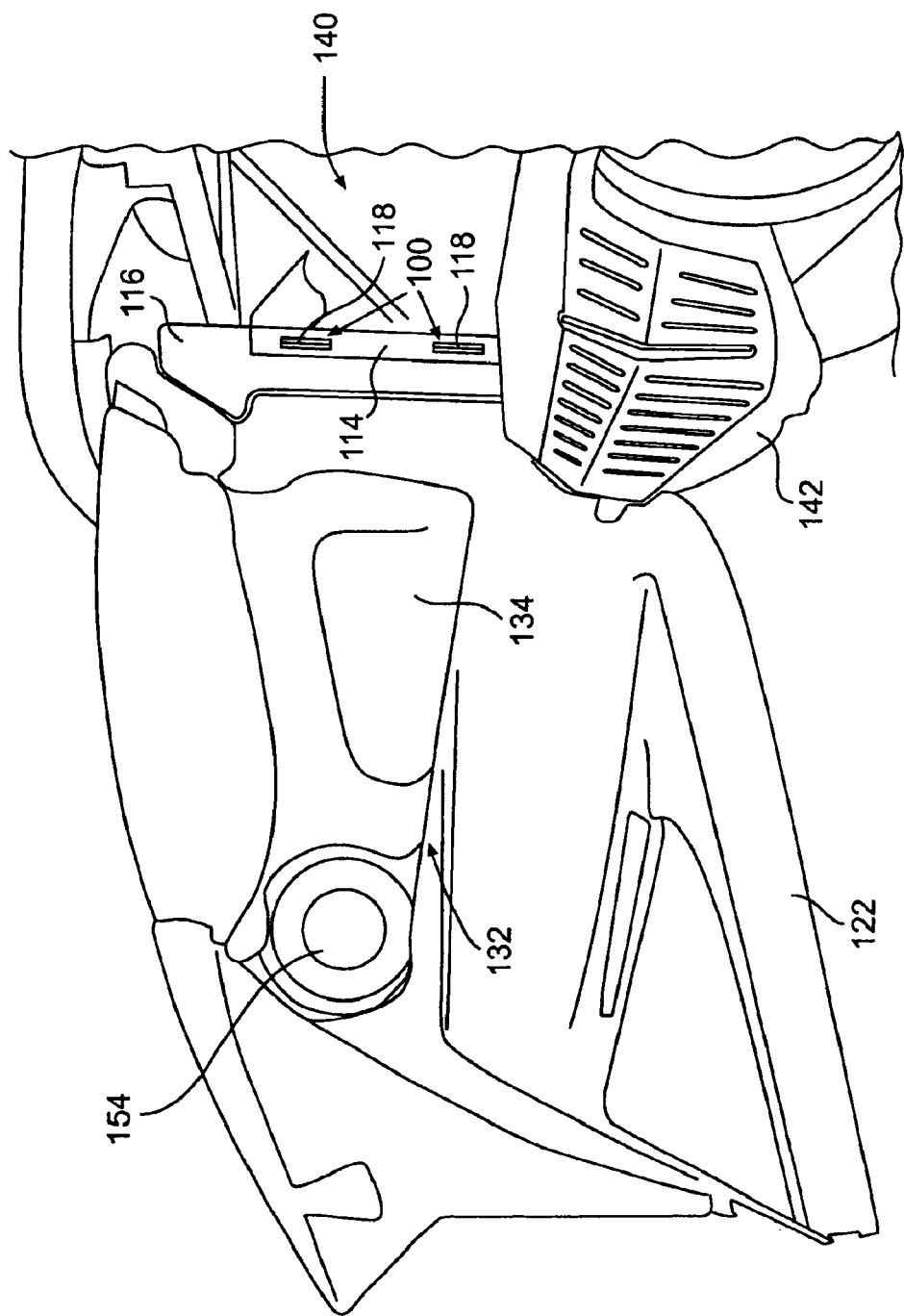
FIG. 15 is a perspective view of a portion of the left side of the snowmobile illustrated in FIG. 1, showing the side panel opened, exposing the portion of the air box attached to the interior surface thereof.
Figure 16:
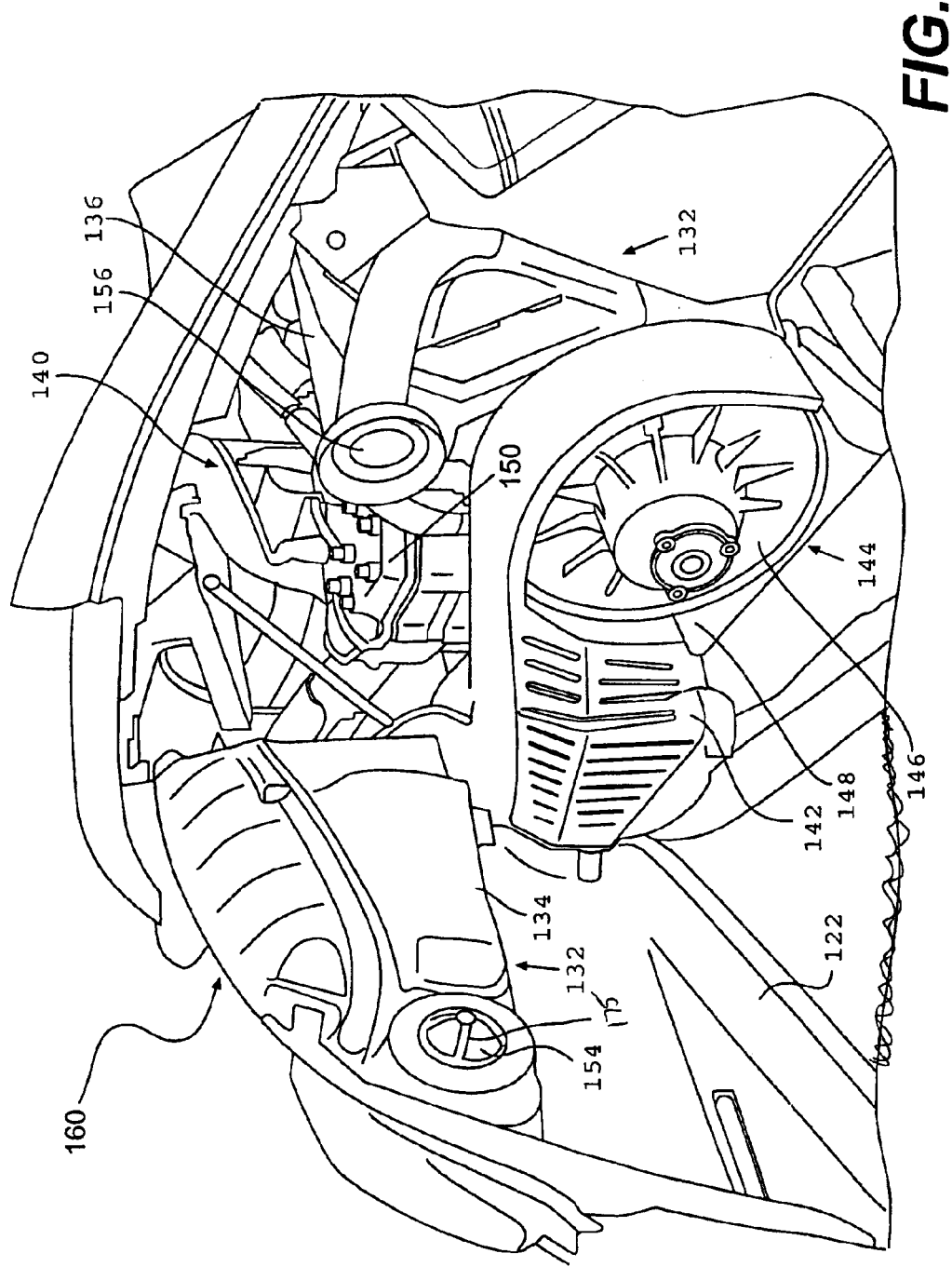
FIG. 16 is another perspective illustration of a portion of the left side of the snowmobile illustrated in FIG. 1, showing the portion of the air box affixed to the interior of the side panel and also showing the remaining portion of the air box positioned within the engine compartment behind the transmission.
Figure 17:
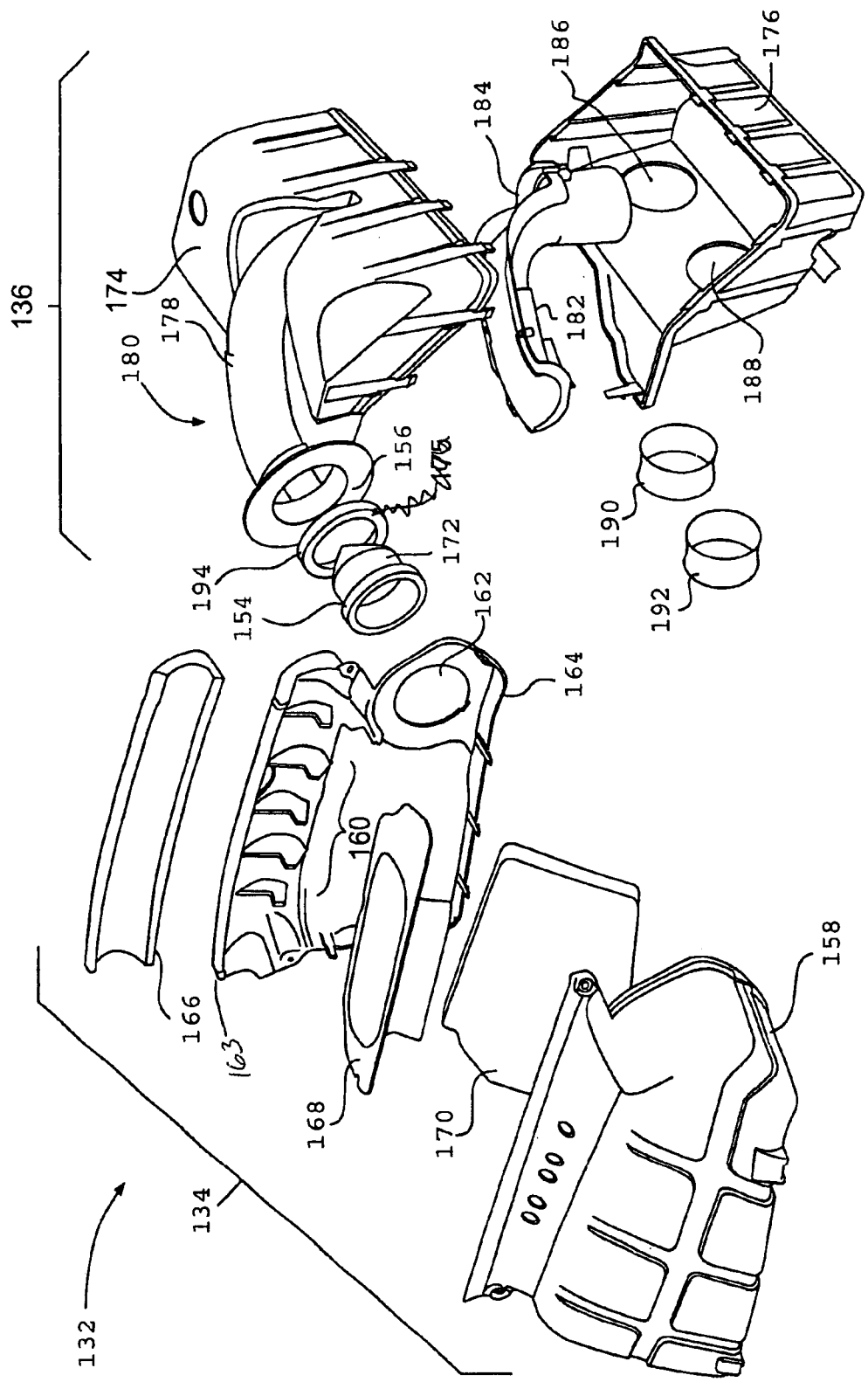
FIG. 17 is an exploded perspective illustration of the two halves of the air box illustrated in FIG. 15.

FIGS. 15–17 illustrate a further feature of the present invention, an airbox assembly 132. The airbox assembly 132 acts as a duct to direct air from the atmosphere towards the engine. The construction of the assembly 132 is such that it reduces the noise that would normally travel through the airbox to the outside environment. Also, assembly 132 supports a foam-type filter 166 to filter any snow or debris from the air vent 160. In the preferred embodiment, the airbox assembly 132 is divided into two separate sections, a side panel portion 134 and an engine compartment portion 136.

The side panel portion 134 of the airbox assembly 132 preferably is constructed from a lightweight material such as plastic. Preferably, the side panel portion 134 attaches to the interior of the side panel 122 by fastener elements (not shown). Alternatively, the side panel portion 134 could be attached to belt guard 142 separate from the side panel 122 as shown in FIG. 18. FIG. 18 illustrates utilizing the space provided above the belt guard 142 for the side panel portion 134 of airbox assembly 132. The engine compartment portion 136 is fixed within the engine compartment 140, which houses engine 150, the general location of which is illustrated in FIG. 16.

The side panel portion 134 and the engine compartment portion 136 of the airbox 132 connect to one another when the side panel 122 is closed to form the entirety of the airbox 132. As illustrated in FIG. 15, the side panel portion 134 of the airbox 132 is preferably mounted to an upper portion of the interior surface of the side panel 122. Accordingly, when the side panel 122 is closed and the side panel portion 134 of the airbox 132 is moved into position within the engine compartment 140, the side panel portion 134 is located above the guard 142 for the snowmobile's continuously variable transmission 144.

Those skilled in the art will readily recognize that snowmobiles are typically provided with a continuously variable transmission (or "CVT") 144. CVTs typically include a driven pulley 146 and a drive pulley 145 (not shown in FIG. 16 because it is hidden behind the guard 142). A belt 148 connects the driven pulley 146 to the drive pulley. To prevent injury to the operator of the snowmobile, should he or she open the side panel 122 when the snowmobile's engine 150 is running, the guard 142 extends over the area in which a transmission belt (not shown) is disposed.

The side panel portion 134 of the airbox 132 draws in air from the environment through one or more vents 160 disposed through the exterior surface of the side panel 122. Air passes into the side panel portion 134 and exits through discharge port 154. From discharge port 154, the air passes into engine compartment portion 136 through inlet port 156. The air then travels through the engine compartment portion 136 before being directed to the engine 150.

FIG. 17 provides an exploded perspective illustration of the airbox 132. As illustrated, side panel portion 134 includes several elements. The side panel portion 134 includes an air intake panel 158 on the side of the side panel portion 134 closest to the side panel 122. Air enters through opening 160 situated between the upper edge 161 of intake panel 158 and the upper edge 163 of external portion 164 and exits from the side panel portion 134 through the guide 172 which is positioned in a circular opening 162 on the external shell 164.

Together, the air intake panel 158 and the external shell 164 form the exterior of the side panel portion 134 of the airbox 132. Within the side panel portion 134, an air filter 166, an admission tube 168 and internal foam 170 are disposed. Air entering the side panel portion 134 passes through the air intake vent 160 and the air filter 166 before being directly downwardly by the admission tube 168. The admission tube 168 and the internal foam 170 cooperate to minimize the sound generated by the engine. In addition, the air filter 166, prevents particulate material (such as snow) from the air stream entering into the airbox 132.

The side panel portion 134 of the airbox 132 is fitted with a guide discharge port 154 fitted with a guide 172. The conically-shaped guide 172 is constructed with four water-droplet-shaped legs 175 extending outwardly and towards the center of the main discharge port 154 that faces the engine compartment 140 when the side panel 122 is closed. The guide 172 is provided so that the side panel portion 134 will mate with the engine compartment portion 136 of the airbox 132 when the side panel 122 is closed. The conically-shaped guide 172 includes water-droplet-shaped legs 175 so that the air can pass unrestricted through the guide 154.

When side panel 122 is open, and thus portions 134 and 136 are separated, guide 172 remains seated in the hole 162. The diameter of the hole 162 is such that the guide 172 has a certain degree of displacement in any direction. This enables the guide 172 to align itself with the flange 156 when the side panel 122 is closed. When side panel 122 is closed, foam gasket 194 insures an airtight seal between side panel portion 134 and engine compartment portion 136, at the same time enabling a certain degree of relative movement between portions 134 and 136 which may occur due to engine vibration or from the vehicle travelling over rough terrain.

As would be recognized by one skilled in the art, guide 172 also could be used when the side panel portion 134 of the airbox 132 is fixedly attached to the belt guard 142. Removal of the belt guard 142 occurs very frequently, thus requiring such a guide 172 between the portions 134 and 136 of the airbox 132 to insure proper sealing and easy alignment upon reattachment of the side panel portion 134 to the belt guard 142.

The engine compartment portion 136 of the airbox 132 is divisible into two parts, an upper shell 174 and a lower shell 176. The upper shell 174 and the lower shell 176 connect to one another to form a closed compartment through which the air passes on its way to the combustion chambers of the engine 150. An upper portion 178 of a tube 180 is, preferably, integrally molded as part of the upper part of the upper shell 174. A lower portion 182 of the tube 180 is affixed within the engine compartment portion 136 of the airbox 132. The lower portion 182 mates with the upper portion 178 to form the tube 180. An edge 184 is included in tube 182 to assist in fixing the lower portion 182 to the upper shell 174. The engine compartment portion 136 includes first and second openings 186, 188 at a lower portion. The first and second openings 186, 188 are fitted with first and second intake adapters 190, 192, which assist in connecting the airbox 132 to the carburetors (not shown) attached to engine 150.

Air enters the engine compartment portion 136 through the inlet port 156 that mates with the guide 172. The air travels into the engine compartment portion 136 through the tube 178. The air is deposited in the lower portion of the engine compartment portion 136 where it is divided and exits through the first and second openings 186, 188 before being delivered to the carburetors (not shown) attached to engine 150.

As mentioned above, to ensure a reasonably airtight seal between the side panel portion 134 and the engine compartment portion 136 of the airbox 132, a foam gasket 194 is positioned on the guide 172. The foam gasket 194 also prevents the side panel portion 134 and the engine compartment portion 136 from rattling against one another during operation of the snowmobile.

The foregoing description is meant to be illustrative of the scope of the present invention and is not meant to be limited solely to the embodiments shown and described. To the contrary, those skilled in the art will readily recognize that variations of the embodiments described may be substituted without departing from the scope of the present invention.

What is claimed is:

1. A snowmobile, comprising:
   at least two skis;
   an engine;
   a track operatively connected to the engine;
   a steering device operatively connected to the at least two skis for steering the snowmobile;
   a chassis for supporting the engine, the track and the steering device; and
   a side panel mounted to the snowmobile, the side panel comprising
      a body having at least one side edge being oriented generally vertically; and
      at least one hinge affixed to the side panel along the at least one side edge, the panel being mounted to the snowmobile via the at least one hinge, whereby the side panel opens along a generally vertical axis defined by the at least one side edge, wherein the body of the side panel further includes an interior surface and an exterior surface and the exterior surface of the side panel deflects air away from a driver of the snowmobile.

2. The snowmobile of claim 1, further comprising:
   at least one fairing including an opening adapted to receive the at least one hinge.

3. The snowmobile of claim 2, wherein the at least one hinge further comprises a protrusion, the protrusion passing through the opening in the at least one fairing when the side panel is mounted to the snowmobile and a lock adapted to connect with the protrusion to prevent the side panel separating from the fairing after the protrusion has been inserted through the opening in the fairing.

4. The snowmobile of claim 3, wherein the protrusion has a T-shaped cross section.

5. The snowmobile of claim 4, wherein the lock includes a locking bar, the locking bar having a C-shaped opening adapted to fit over the protrusion of the hinge to prevent the protrusion from passing through the opening in the fairing.

6. The snowmobile of claim 5, wherein the locking bar slides over the protrusion and the locking bar further includes inwardly protruding pins to prevent the locking bar from sliding off the protrusion.

7. The snowmobile of claim 3, wherein the protrusion has a tubular cross section.

8. The snowmobile of claims 3, wherein the panel and the hinge including the protrusion are integrally molded.

9. The snowmobile of claim 1, wherein the body includes a hole defining at least one air vent whereby air passes therethrough.

10. The snowmobile of claim 1, further comprising:
    an airbox attached to an interior surface of the body of the side panel.

11. The snowmobile of claim 1, wherein the side panel is removable from the snowmobile.

12. The snowmobile of claim 1, further comprising at least one air deflector on the exterior surface of the side panel.

13. A snowmobile, comprising:
    at least two skis;
    an engine;
    a track operatively connected to the engine;
    a steering device operatively connected to the at least two skis for steering the snowmobile;
    a chassis for supporting the engine, the track and the steering device; and
    a side panel mounted to the snowmobile, the side panel comprising
       a body having at least one side edge at a forward position thereof and being oriented generally vertically; and
       at least one hinge affixed to the side panel along the at least one side edge, the panel being mounted to the snowmobile via the at least one hinge, whereby the side panel opens along a generally vertical axis defined by the at least one side edge.

14. A snowmobile, comprising:
    at least two skis;
    an engine;
    a track operatively connected to the engine;
    a steering device operatively connected to the at least two skis for steering the snowmobile;
    a chassis for supporting the engine, the track and the steering device; and
    a side panel mounted to the snowmobile, the side panel comprising
       a body having at least one side edge being oriented generally vertically; and
       at least one hinge affixed to the side panel along the at least one side edge, the panel being mounted to the snowmobile via the at least one hinge, whereby the side panel opens along a generally vertical axis defined by the at least one side edge, wherein the side panel extends at least from a drive pulley to a driven pulley of a continuously variable transmission.

15. A snowmobile, comprising:
at least two skis;
an engine;
a track operatively connected to the engine;
a steering device operatively connected to the at least two skis for steering the snowmobile;
a chassis for supporting the engine, the track and the steering device; and
a side panel mounted to the snowmobile, the side panel comprising
a body having at least one side edge being oriented generally vertically; and p2 at least one hinge affixed to the side panel along the at least one side edge, the panel being mounted to the snowmobile via the at least one hinge, whereby the side panel opens along a generally vertical axis defined by the at least one side edge, wherein the body of the side panel further includes an interior surface and an exterior surface and the exterior surface of the side panel deflects air away from a driver of the snowmobile, further comprising a rearwardly positioned leg support wall on the side panel that accommodates and protects the knees of an operator.

\* \* \* \* \*